US008863739B2

(12) United States Patent
García et al.

(10) Patent No.: US 8,863,739 B2
(45) Date of Patent: Oct. 21, 2014

(54) STRUCTURE FOR LIFTING AND MOUNTING HELIOSTATS AND TROLLEY FOR MOVING SAID HELIOSTAT

(75) Inventors: Francisco Cerón García, Sevilla (ES); Emiliano Cornago Ramírez, Sevilla (ES); Joaquín De Río Martín, Sevilla (ES)

(73) Assignee: Abengoa Solar New Technologies S.A., Sevilla (ES)

( * ) Notice: Subject to any disclaimer, the term of this patent is extended or adjusted under 35 U.S.C. 154(b) by 315 days.

(21) Appl. No.: 13/387,105

(22) PCT Filed: Jul. 26, 2010

(86) PCT No.: PCT/ES2010/070515
§ 371 (c)(1),
(2), (4) Date: Mar. 7, 2012

(87) PCT Pub. No.: WO2011/012756
PCT Pub. Date: Feb. 3, 2011

(65) Prior Publication Data
US 2012/0176695 A1 Jul. 12, 2012

(30) Foreign Application Priority Data
Jul. 28, 2009 (ES) .................................. 200930523

(51) Int. Cl.
 *F24J 2/38* (2014.01)
 *B66C 1/10* (2006.01)
 *B66C 1/62* (2006.01)
 *F24J 2/10* (2006.01)
 *F24J 2/52* (2006.01)

(52) U.S. Cl.
CPC ... *B66C 1/62* (2013.01); *B66C 1/10* (2013.01); *F24J 2/10* (2013.01); *F24J 2/52* (2013.01); *F24J 2002/5281* (2013.01)
USPC ......................................................... 126/605

(58) Field of Classification Search
USPC .......... 359/600, 605, 608, 627; 126/600, 605, 126/608, 627
See application file for complete search history.

(56) References Cited

U.S. PATENT DOCUMENTS

| 4,915,567 A | 4/1990 | Ellingsen et al. |
|---|---|---|
| 5,671,960 A | 9/1997 | Chyz et al. |
| 2010/0236539 A1* | 9/2010 | Lee .............................. 126/600 |

FOREIGN PATENT DOCUMENTS

| FR | 1431799 | 6/1966 |
| JP | 1317919 | 12/1989 |

OTHER PUBLICATIONS

PCT International Search Report mailed Oct. 8, 2010, PCT Apln. No. PCT/ES2010/070515 filed Jul. 26, 2010 (3 pages).

*Primary Examiner* — Jennifer L. Doak
(74) *Attorney, Agent, or Firm* — Blakely, Sokoloff, Taylor & Zafman, LLP

(57) ABSTRACT

It allows lifting the heliostat in the warehouse and placing it on the cart, and once it reaches the installation spot in the field, the lifting structure is used to lift the heliostat from the cart and place it on a previously installed pedestal. The structure formed by an upper arch and two lower bases, being the upper arch, comprised at the same time by a central, elongated and horizontal profile, which presents two lateral profiles on its ends, from which vertical plates start at the bottom, provided with a hole in the proximity of its lower ends, through which the upper arch (2) is linked to the lower bases through some fixing mechanism, having the lower bases a semicircular support adapted to receive one of the support arms of the heliostat.

12 Claims, 6 Drawing Sheets

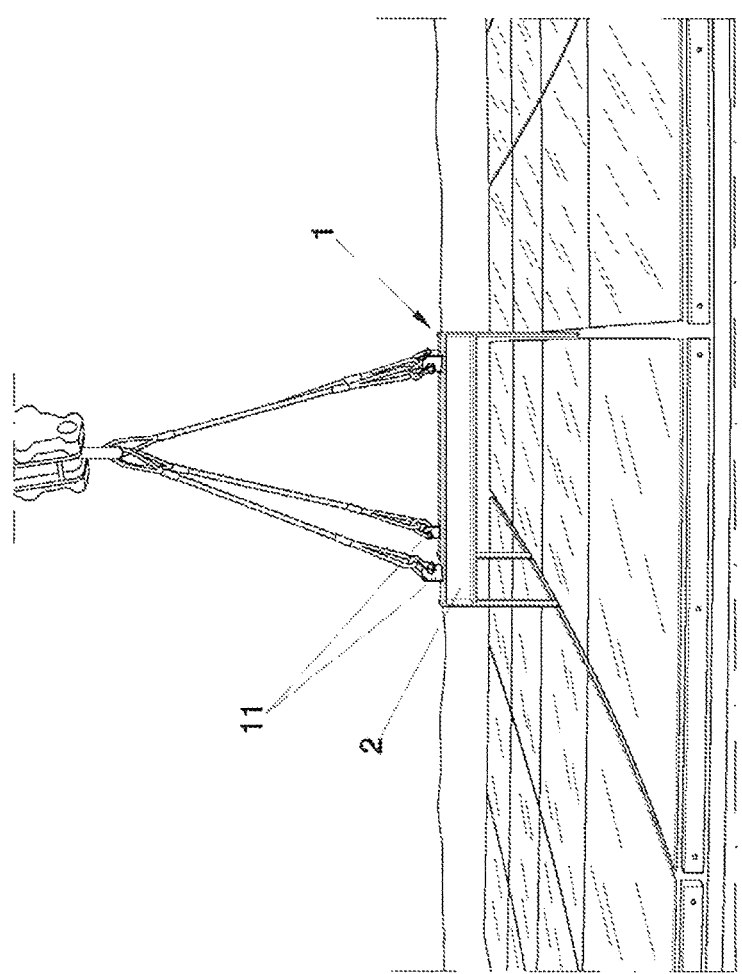

STRUCTURE FOR LIFTING AND MOUNTING HELIOSTATS AND TROLLEY FOR MOVING SAID HELIOSTAT

CROSS-REFERENCE TO RELATED APPLICATIONS

The present patent application is a national phase application of International Application No. PCT/ES2010/070515, filed Jul. 26, 2010, which application claims priority to Spanish Application No. P 200930523, filed Jul. 28, 2009.

FIELD OF THE INVENTION

1. Object of the Invention

The present invention belongs to the field of renewable energies, and more specifically to the use of solar energy through photovoltaic panels or heliostats.

The main object of the present invention is a lifting and assembling structure for heliostats, wherein said heliostats are assembled in the warehouse for their subsequent transport to the field by means of a cart especially adapted for it.

2. Background of the Invention

In recent times the investigation for the search of solutions that allow the adoption of alternative energies for the exploitation of natural resources has been increasing progressively. In this sense, ecological energies and inexhaustible resources, such as wind and solar energy, have had a special development, wherefore investigations are essentially based toward obtaining means that allow the utilization of said energies with a performance that makes its application feasible.

The use of solar energy can be carried out either by means of photovoltaic technology that directly transforms the solar energy into electrical energy, or by transforming the solar energy into a heat function.

In any case, the use of the solar energy requires determining the conditions that allow obtaining the maximum uptake of solar rays. Therefore it is fundamental that the orientation of the panels, in the case of photovoltaic solar energy or the mirrors in the case of technology related to concentration solar thermal energy, is adequate, such that said panels or mirrors are able to carry out a solar tracking movement in azimuth and/or elevation depending on the different applications and the technology that is being considered.

In the case of photovoltaic solar energy the panels can include fixed or mobile structures. Fixed structures are the easiest, both in regard to assembly and maintenance, and are therefore the most economical, although they don't use all the available solar energy, as the solar rays don't always fall perpendicularly on the corresponding heliostats or photovoltaic panels. As for mobile structures, they are designed to capture the most solar radiation possible, being capable of increasing the performance up to 40% with respect to the fixed structures, although in return, the initial investment as well as the maintenance cost is significantly greater.

In regard to the production of thermoelectric energy from solar concentration technologies, three types of systems can be differentiated: Stirling disks, parabolic trough collectors and the technology that is here being dealt with, central receiver technology.

Central receiver systems are constituted by a field of heliostats, these being large surface mirrors (40-125 $m^2$ by unit) called heliostats with solar tracking, which reflect the direct solar radiation on one or several central receivers situated in the upper part of a tower of great height. These receivers are usually housed in cavities located in the tower itself.

At this point, the conversion of radiant energy into thermal energy occurs, and the working fluid contained in the receiver can be water steam, molten sodium or molten salt. If the plant uses water steam, said water steam is directly carried to a turbine. In the other methods the fluid transports the heat to an exchanger for the production of steam, which will make a turbine run for moving an electric generator. The operation of the tower's technology is based on three characteristic elements: the heliostats, the receiver and the tower.

Heliostats have the function of capturing the solar radiation and directing it to the receiver. They comprise a reflective surface, a structure which serves as a support, and mechanisms that allow directing them to track the movement of the sun. Reflective surfaces more currently employed are glass mirrors.

The receiver transfers the heat received to a working fluid. If this fluid is steam it is led directly to a turbine, if it is another heat-transfer fluid it is led to a heat exchanger for steam production.

The tower serves as a support to the receiver, which should be located at a certain height above the level of the heliostats in order to minimize the so-called cosine effect (effect by which the area of a heliostat does not see the sun in its entirety, because of the angle formed by the incident rays with the normal to the surface of the heliostat).

A heliostat basically consists of a reflective surface composed of multiple flat, and/or curved panels, a support structure, and a control mechanism provided with engines for the correct orientation and solar tracking. Said panels lean on a reticulate structure (called frame), and said frame in turn leans on two support arms of the heliostat, which are supported by a pedestal.

At present, the assembly of the different elements that make up the heliostats or photovoltaic trackers is carried out in the field, with the consequent problems that this involves: defects and damages of the parts, less security and accuracy of the devices, etc. Besides, this installation involves an operating complexity during the assembly phase, leading to excessive time consuming, which is susceptible of optimization.

SUMMARY OF THE INVENTION

By means of the present invention, the drawbacks mentioned above are overcome, providing a tool for lifting and placing a heliostat which is previously assembled in the warehouse on the corresponding pedestal, for its subsequent transport to the field by means of a cart especially adapted for it, and that once it reaches the heliostat installation spot in the field, it is lifted by means of the structure object of the invention, for its assembly on the previously installed pedestal.

The lifting and assembly structure object of the present invention comprises an upper arch and two lower bases, said lower bases being linked to the upper arch by fixing means that preferably consist of washers, screws and nuts.

The upper arch comprises a central, elongated and horizontal profile, at which ends having two lateral profiles perpendicular to the central, and it's linked to said central profile in its mid-point, from said lateral profiles some vertical plates start at the bottom and are adapted to go through the heliostat by being introduced in some existing spaces among panels, and are provided with a hole in the proximity of their lower ends, through which the upper arch is linked to the lower bases.

Said central profile is provided with a main ring on its upper side, adapted to be hooked by a crane, through which the lifting of the structure object of the invention is carried out.

Also, the lateral profiles are equipped in turn with secondary rings preferably placed in oblique direction, and located in the proximity of the ends of said lateral profiles.

On the other hand, each of the lower bases comprise a semicircular support on their central upper face, adapted to receive each of the support arms of the heliostat, said lower bases being provided with flanges on their lateral ends which have a hole, for their attachment to the upper arch by the fixing means previously mentioned.

Preferably the semicircular supports have some cylindrical bodies on their lateral faces in which some ropes, cables or slings that embrace the support arm of the heliostat on the upper part are introduced for greater stability of said support arm and greater attachment of said support arm to the semicircular support of the lower base.

According to a preferred embodiment of the invention, both the central profile and the two lateral profiles of the upper arch, and the lower bases show a configuration in I.

The assembling phase of the heliostat on the pedestal is carried out by means of a crane to which the upper arch of the lifting structure is hooked through its rings first and subsequently going through the heliostat, inserting the vertical plates of the upper arch in the existing spaces among panels. Subsequently the attachment of the upper arch with the lower bases takes place by using the fixing means. Finally, the lifting of the structure is carried out by means of the crane, which lifts the heliostat for its final location on the pedestal that was previously installed at the adequate spot in the field.

Another aspect of the invention is a cart especially adapted to perform the transport of the heliostat from the warehouse to the adequate installation spot in the field. Said cart comprises a chassis with beams that have support plates on which the lower bases of the lifting structure lay, and in whose semicircular supports are the support arms of the heliostat.

Preferably said cart comprises four wheels, a front axle and a rear axle, in whose ends the wheels are located, and a trailer on its front, adapted to be hooked and towed by a tractor or similar.

Therefore, the lifting structure here described has preferably two applications: on the one hand it serves to lift the heliostat in the warehouse and place it on the cart; on the other hand, once it arrives at the installation spot in the field, the lifting structure is used to lift the heliostat from the cart and place it on the pedestal that was previously installed.

BRIEF DESCRIPTION OF THE DRAWINGS

To complement the description being made and in order to help better understand the features of the invention, according to a preferred practical embodiment thereof, a set of drawings is attached as an integral part of said description, wherein the following is shown as way of illustration but not limited to:

FIG. 6.—Shows a side view of a heliostat being lifted by a crane using the lifting structure object of the invention through some slings linked to the secondary rings.

DETAILED DESCRIPTION OF THE INVENTION

Figure 1:
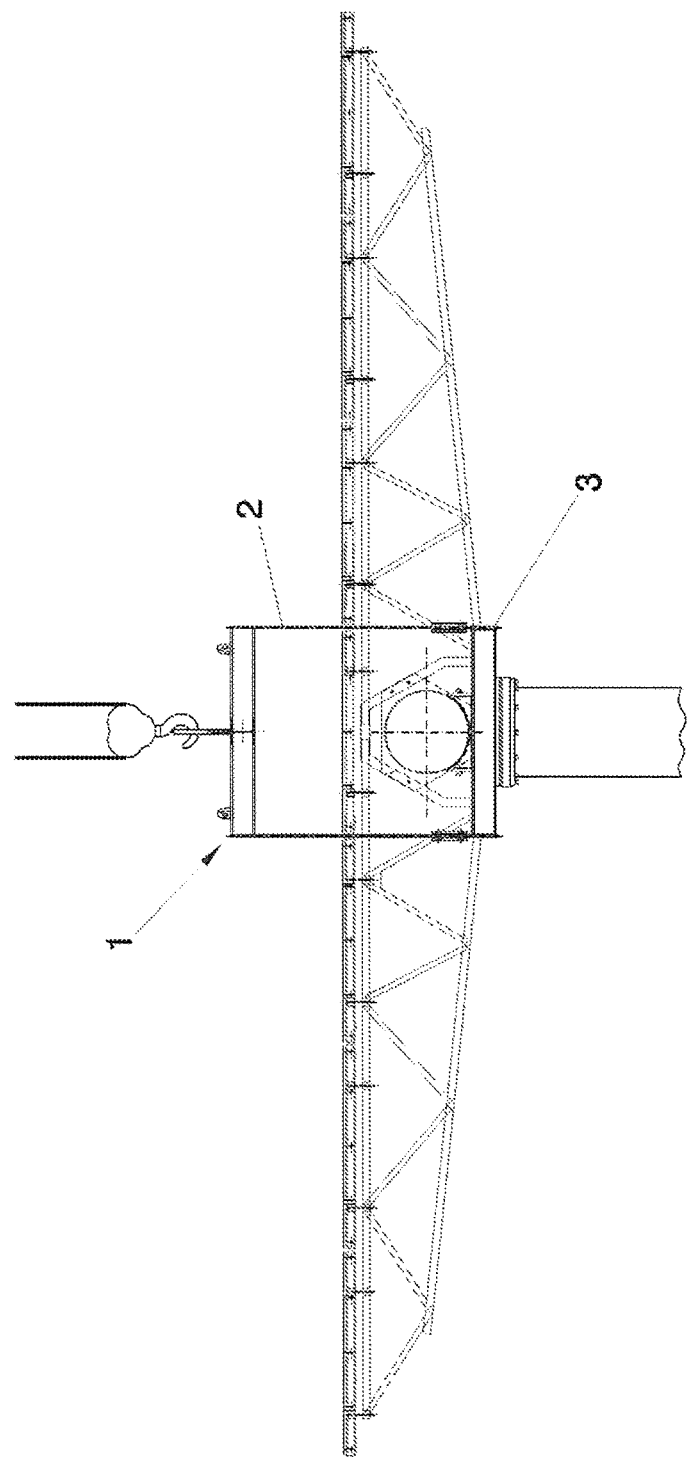
FIG. 1.—Shows a side elevational view wherein the assembly of a heliostat on a pedestal is shown, using the lifting structure object of the invention.
Figure 2:
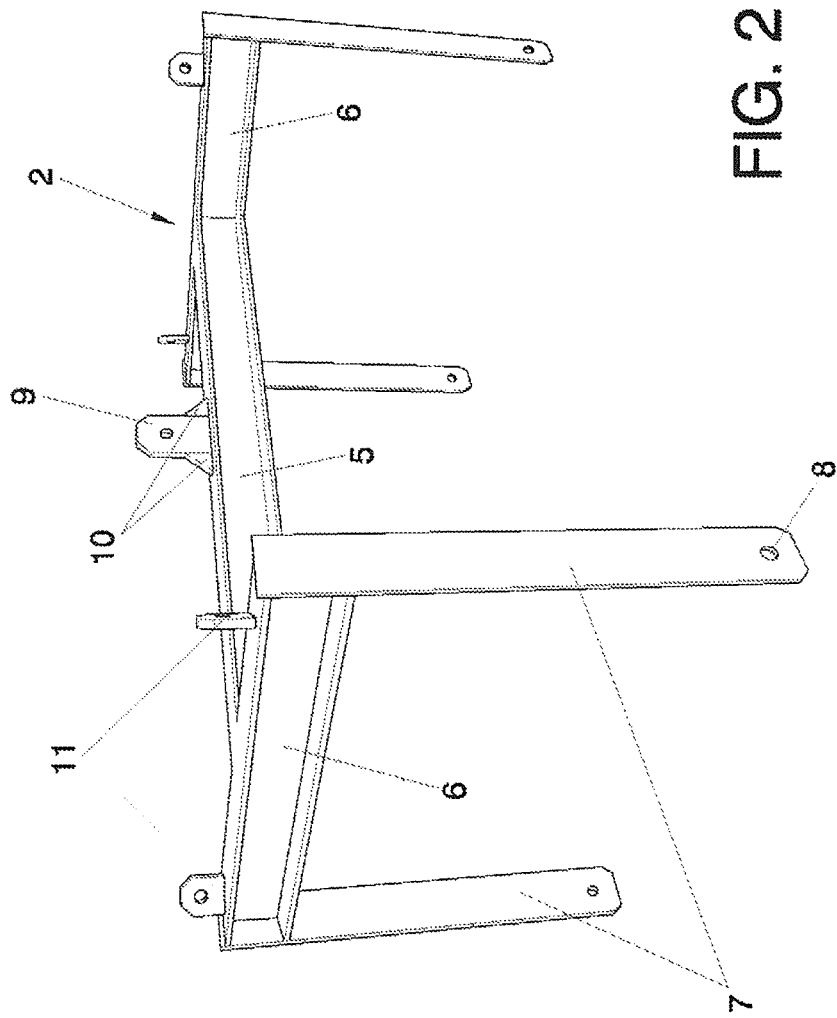
FIG. 2.—Shows a perspective view of the upper arch of the lifting and assembly structure object of the invention.
Figure 3:
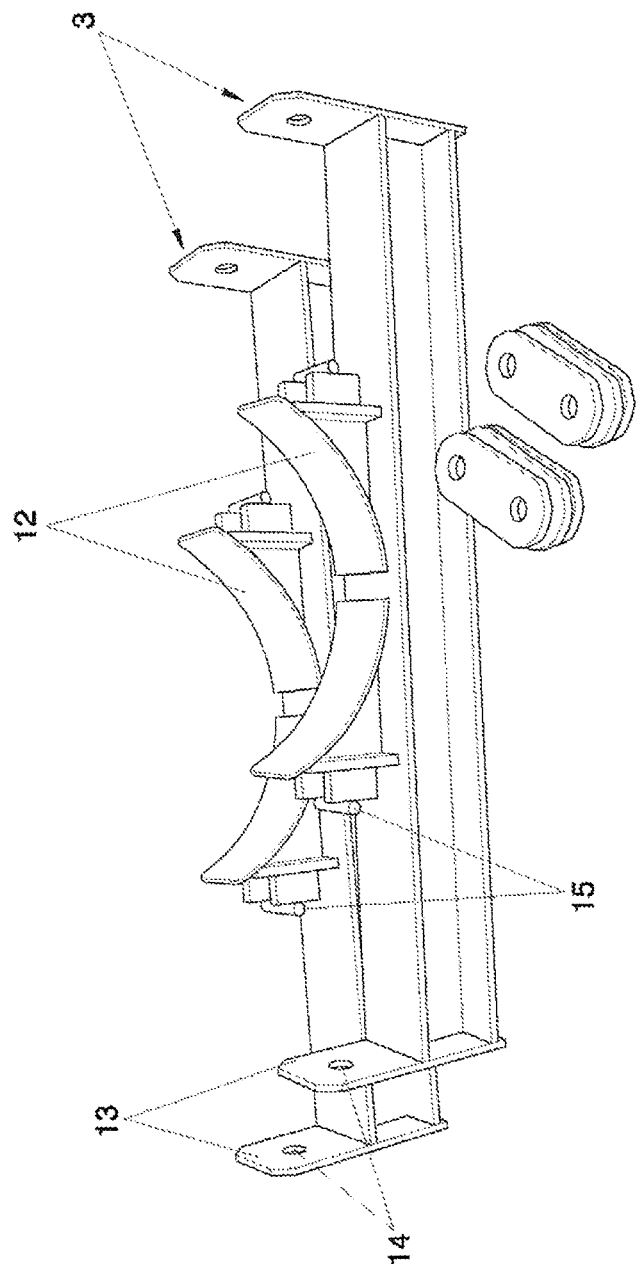
FIG. 3.—Shows a perspective view wherein the two lower bases that make up the lifting structure object of the invention are shown, which incorporate semicircular supports as well as lateral flanges.
Figure 5:
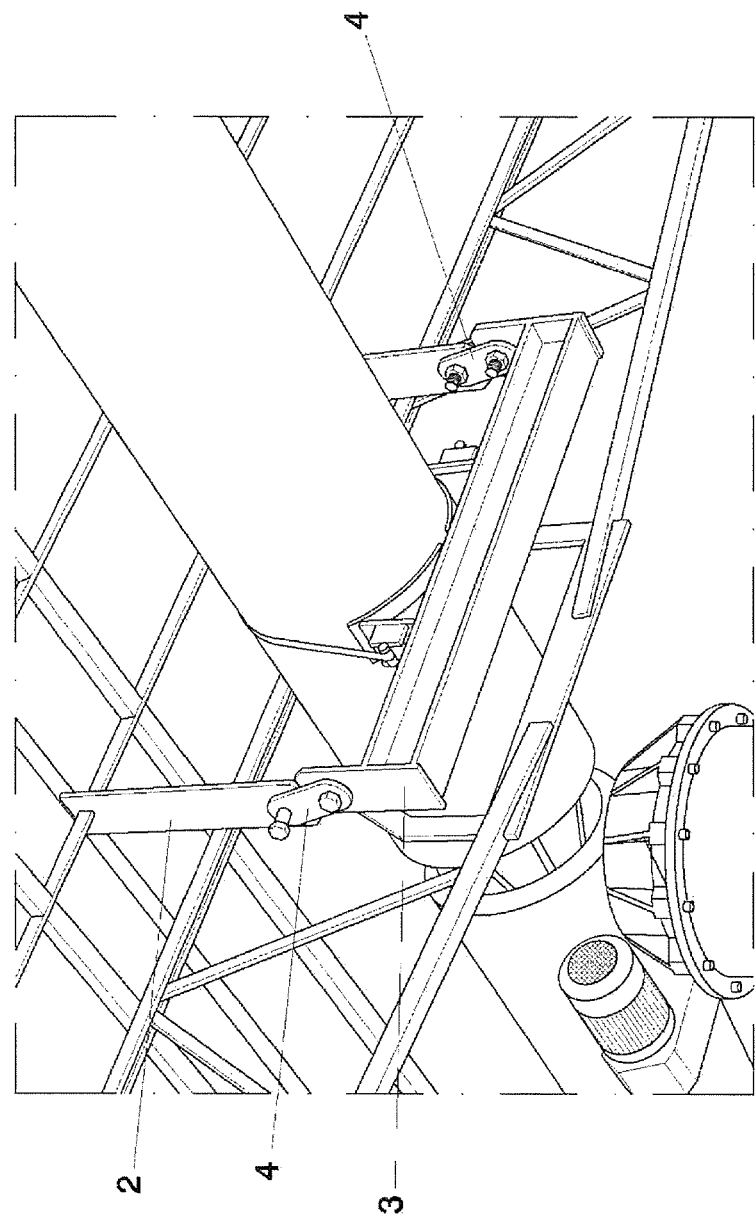
FIG. 5.—Shows a bottom view of the heliostat during its installation on a pedestal using the lifting structure object of the invention, wherein one of the support arms of the heliostat placed on the semicircular support of the lower base is shown.

As shown in FIGS. 1-3, the lifting and assembly structure (1) comprises an upper arch (2) and two lower bases (3), said lower bases (3) being linked to the upper arch (2) by fixing means (4), represented in FIG. 5, consisting of washers, screws and nuts.

The upper arch (2), which is represented in FIG. 2, comprises a central, elongated and horizontal profile (5), in whose ends having two lateral profiles (6) perpendicular to the central profile (5), said lateral profiles (6) being linked at their mid-points to said central profile (5), wherein starting from said lateral profiles (6) at the bottom there are vertical plates (7) provided with a hole (8) in the proximity of their lower ends, through which the upper arch (2) is linked to the lower bases (3).

Said central profile (5) is provided with a main ring (9) in its upper face adapted to be hooked by a crane, by means of which the lifting of the structure (1) is carried out, additionally presenting lateral brackets (10) for a greater reinforcement and solidity of the upper arch (2). Also, the lateral profiles (6) are equipped in turn with secondary rings (11) shown in FIGS. 2 and 6, placed in oblique direction, and located in the proximity of the ends of said lateral profiles (6).

On the other hand, the two lower bases (3) shown in FIG. 3 comprise a semicircular support (12) located on the central area of their upper faces, said semicircular support (12) adapted to receive each of the support arms of the heliostat, said lower bases (3) being provided with flanges (13) on their lateral ends which have a hole (14), for their attachment to the upper arch (2) by the fixing means (4) previously mentioned.

Also, the semicircular supports (12) are shown in FIGS. 3 and 5, which have some cylindrical bodies (15) on their lateral faces in which some ropes, cables or slings, that embrace the support arm of the heliostat on the upper part, are introduced for greater stability of said support arm and for greater attachment and stability of said support arm to the semicircular support (12) as shown in FIG. 5.

As it can be seen in FIGS. 2 and 3, both the central profile (5) and the two lateral profiles (6) of the upper arch (2), and the lower bases (3) show a configuration in I.

Figure 4:
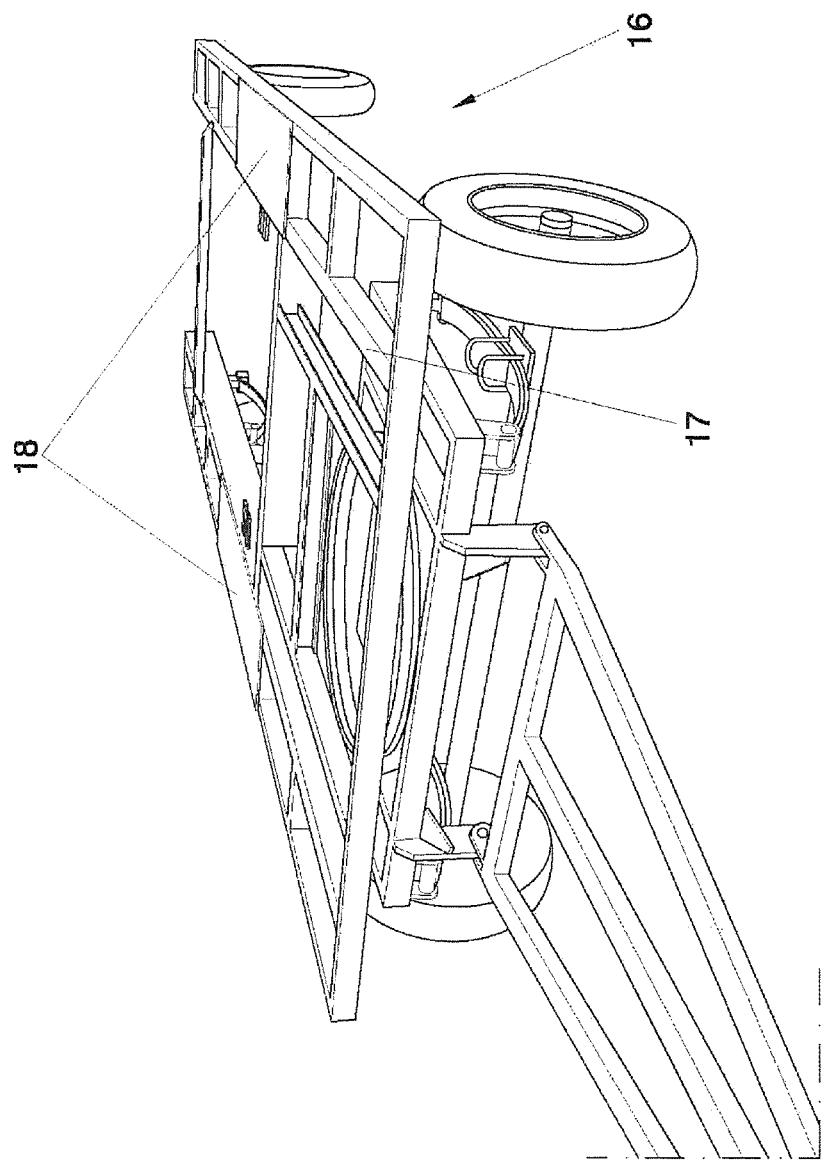
FIG. 4.—Shows a perspective view of the cart object of the invention for transporting the heliostat.

FIG. 4 shows a cart (16), which is another object of the invention, specially adapted to perform the transport of the heliostat from the warehouse to the proper installation spot in the field. Said cart (16) comprises a chassis (17) with beams that have support plates (18) on which the lower bases (3) of the lifting structure (1) lay, and in whose semicircular supports (14) are the support arms of the heliostat.

FIGS. 5 and 6 show views of the assembly process of a heliostat on a pedestal, once said heliostat has reached the installation spot in the field, and using the lifting structure (1) object of the invention. FIG. 6 shows that the vertical plates (7) go through the heliostat by being introduced in the existing spaces between panels.

The invention claimed is:
1. A heliostat lifting and assembling structure, intended for lifting and assembling a heliostat, the heliostat comprising:
a reflective surface composed of multiple flat and/or curved panels that are supported on a reticulated structure, and the reticulated structure is on tour supported on some straps holding two support arms comprised in the heliostat, and a control mechanism provided with motors for the correct solar orientation, the assembling structure comprising:

two lower bases each one of the lower bases featuring a semicircular support adapted to receive one of the support arms of the heliostat, an upper arch comprising a central, elongated and horizontal profile, two lateral profiles on the ends of the upper arch and linked to the central profile at their mid-points, vertical plates starting at the bottom of the lateral profiles and adapted to go through the heliostat through introduction in some spaces located among panels, and a hole in the proximity of the lower ends of the vertical plates, through which the upper arch is linked with the lower bases by a fixing mechanism.

2. The assembling structure of claim 1, wherein the central profile of the upper arch is provided in its upper face with a main ring, adapted to be hooked by a crane, for lifting the structure.

3. The assembling structure according to claim 2, wherein the main ring additionally comprises some lateral brackets for a greater reinforcement and solidity of the upper arch.

4. The assembling structure of claim 1, characterized in that the lateral profiles are provided with secondary rings.

5. The assembling structure of claim 4, wherein the secondary rings are arranged in oblique direction, and located in the proximity of the ends of the lateral profiles.

6. The assembling structure of claim 1, wherein the two lower bases have some flanges on their lateral ends, the flanges featuring a hole, for their attachment to the upper arch.

7. The assembling structure of claim 1, wherein the semicircular supports have cylindrical bodies on their lateral faces.

8. The assembling structure of claim 1, wherein the central profile, the two lateral profiles of the upper arch, and the lower bases show a configuration in an I-shape.

9. The assembling structure of claim 1, characterized in that the fixing mechanism comprises washers, screws and nuts.

10. A heliostat assembling method comprising the steps of:

first lifting of the heliostat located in the interior of a warehouse, using a structure comprising:

two lower bases each one of the lower bases featuring a semicircular support adapted to receive one of the support arms of the heliostat, an upper arch comprising a central, elongated and horizontal profile, two lateral profiles located on the ends of the upper arch and linked to the central profile at their mid-points, vertical plates starting at the bottom of the lateral profiles and adapted to go through the heliostat through introduction in some spaces located among panels, and a hole provided in the proximity of the lower ends of said vertical plates, through which hole the upper arch is linked with the lower bases by a fixing mechanism;

arranging the heliostat on support plates located in some beams of a chassis of a transporting cart;

hooking the cart by a tractor or similar, through a trailer located in the front of the tractor or similar, for towing the cart towards the spot of installation in the field of the cart, and final lifting of the heliostat from its position in the cart to a final position on a pedestal which has previously been installed in the proper spot in the field.

11. The method of claim 10, wherein both the first lifting and the second lifting are carried through a crane adapted to hook some rings located on the upper arch of the structure.

12. The method of claim 10, wherein the first lifting is carried out in the following way:

the crane is hooked to the upper arch of the structure through the hooks;

the vertical plates of the upper arch are inserted through some spaces located between some panels in the heliostat;

the upper arch and the lower bases are linked by means of a fixing mechanism; and the structure is lifted by means of the crane, thereby lifting the heliostat, and the heliostat is arranged on the cart.

* * * * *